(12) United States Patent
Ro (10) Patent No.: US 8,679,673 B2
(45) Date of Patent: Mar. 25, 2014

(54) CAP ASSEMBLY, CAN, AND SECONDARY BATTERY EMPLOYING THE SAME

(75) Inventor: Hun-Tae Ro, Yongin-Si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 330 days.

(21) Appl. No.: 12/848,878

(22) Filed: Aug. 2, 2010

(65) Prior Publication Data

US 2011/0076543 A1    Mar. 31, 2011

(30) Foreign Application Priority Data

Sep. 30, 2009    (KR) .................. 10-2009-0093211

(51) Int. Cl.
*H01M 2/02*    (2006.01)
(52) U.S. Cl.
USPC ........................ 429/170; 429/175; 429/121
(58) Field of Classification Search
USPC ......................... 429/170, 175, 121
See application file for complete search history.

(56) References Cited

U.S. PATENT DOCUMENTS

| 2007/0154798 A1 | 7/2007 | Jung |
| 2007/0196731 A1 | 8/2007 | Hyung et al. |
| 2008/0166630 A1 | 7/2008 | Okabe et al. |
| 2008/0254357 A1* | 10/2008 | Liu ............................. 429/161 |
| 2009/0068555 A1 | 3/2009 | Fukuoka et al. |
| 2009/0226803 A1* | 9/2009 | Nishino et al. ............... 429/149 |

FOREIGN PATENT DOCUMENTS

| JP | 1999167912 | 6/1999 |
| JP | 2008-251472 | 10/2008 |
| KR | 10-2004-0026261 | 3/2004 |
| KR | 0709872 B1 | 4/2007 |
| KR | 10-2007-0067783 | 6/2007 |
| KR | 20070082969 | 8/2007 |
| KR | 10-2008-0018748 | 2/2008 |

OTHER PUBLICATIONS

Korean Office Action issued by KIPO, dated Jan. 18, 2011, corresponding to Korean Patent Application No. 10-2009-0093211, together with Request for Entry.

* cited by examiner

*Primary Examiner* — Jane Rhee (74) *Attorney, Agent, or Firm* — Robert E. Bushnell, Esq.

(57) ABSTRACT

Provided are a cap assembly and a can, and a secondary battery. The secondary battery includes a plurality of bare cells, each of which includes a cap-up used as an electrode terminal; and a conductive plate installed on top of the cap-ups and connecting a plurality of adjacent bare cells in series or in parallel, wherein a plurality of embossments are formed on the cap-up, a slit is formed in the conductive plate, and the conductive plate is welded to the embossments. Therefore, since a cap-up may be properly welded to a desired position on a conductive plate, bad welding may be reduced, and welding strength may be improved.

23 Claims, 5 Drawing Sheets

CAP ASSEMBLY, CAN, AND SECONDARY BATTERY EMPLOYING THE SAME

CLAIM OF PRIORITY

This application claims makes reference to, incorporates the same herein, and claims all benefits accruing under 35 U.S.C. §119 from an application earlier filed in the Korean intellectual Property Office on 30 Sep. 2009 and there duly assigned Serial No. 10-2009-0093211.

BACKGROUND OF THE INVENTION

1. Field of the Invention

One or more embodiments of the present invention relate to a cap assembly and a can, and a secondary battery employing the same, more specifically, to a cap assembly and a can for reducing bad welding when a plurality of bare cells are electrically connected to each others, and a secondary battery employing the same.

2. Description of the Related Art

Generally, unlike a non-chargeable primary battery, a secondary battery is a battery that may be recharged. Secondary batteries may be used as power sources for small mobile devices, such as cellular phones, laptop computers, electric motor vehicles, hybrid electric motor vehicles, electric bicycles, and uninterrupted power supplies (UPS). On the other hand, the large devices require high power output and high capacity, and thus may require battery modules, in which a plurality of battery cells are electrically connected to each other.

SUMMARY OF THE INVENTION

It is therefore one object for the present invention to provide an improved cap assembly and an improved can for reducing bad welding when a plurality of bare cells are electrically connected to each others, and an improved secondary battery employing the same.

Additional aspects will be set forth in part in the description which follows and, in part, will be apparent from the description, or may be learned by practice of the presented embodiments.

In accordance with one or more embodiments of the present invention, a secondary battery includes a plurality of bare cells, each of which includes a cap-up used as an electrode terminal; and a conductive plate installed on top of the cap-ups and connecting a plurality of adjacent bare cells in series or in parallel, wherein a plurality of embossments are fowled on the cap-up, a slit is formed in the conductive plate, and the conductive plate is welded to the embossments.

When a center of the slit is positioned on an imaginary symmetry axis of the cap-up facing the slit, the embossments are arranged such that the ratios between the area occupied by the embossments in each of regions of the cap-up separated by the imaginary symmetry axis of the cap-up and the area of each of the regions of the cap-up are the same.

The same number of embossments are formed on each of the divided regions of the cap-up.

The entire area occupied by the embossments is less than the area of the cap-up minus the area of the portion having the same size as the slit.

The slit is a straight slit formed in the conductive plate, a cross-shaped slit formed in the conductive plate, a slit formed by partially cutting the conductive plate from an edge of the conductive plate across a center of the conductive plate, a circular slit formed in the conductive plate, an elliptical slit formed in the conductive plate, or a polygonal slit formed in the conductive plate.

In accordance with one or more embodiments of the present invention, a cap assembly of a secondary battery for sealing an opening of a can of a bare cell for housing a battery unit, the cap assembly includes a cap-up installed on top of the can and functions as an electrode terminal; a plurality of safety elements installed between the battery unit and the cap-up; and a gasket installed around the safety elements and the conductive cap-up, wherein a plurality of embossments are formed on the cap-up to be welded to a conductive plate having a slit to connect a plurality of adjacent bare cells in series or in parallel, and the embossments are arranged such that the ratios between the area occupied by the embossments in each of regions of the cap-up separated by the imaginary symmetry axis of the cap-up and the area of each of the regions of the cap-up are the same.

The cap-up includes a base and a terminal protruding from the base toward the conductive plate, and the embossments protrudes from the terminal toward the conductive plate.

In accordance with one or more embodiments of the present invention, a can for a bare cell housing a battery unit, wherein an electrode lead connected to the battery unit is electrically connected to the can, a plurality of embossments, to which a conductive plate having a slit is to be welded to connect a plurality of adjacent bare cells in series or in parallel, are formed on the bottom of the can, and the embossments are arranged such that the ratios between the area occupied by the embossments in each of regions of the bottom of the can separated by the imaginary symmetry axis of the bottom of the can with respect to the area of each of the regions of the bottom of the can are the same.

In accordance with one or more embodiments of the present invention, a secondary battery includes a plurality of bare cells, each bare cell including a can for housing a battery unit; and a cap assembly including: a cap-up installed on top of the can and functions as an electrode terminal; a plurality of safety elements installed between the battery unit and the cap-up; and a gasket installed around the safety elements and the conductive cap-up; and a conductive plate installed on top of the cap-ups and connecting a plurality of adjacent bare cells in series or in parallel, wherein a plurality of embossments are formed on the cap-up, a slit is formed in the conductive plate, and the conductive plate is welded to the embossments.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

While a small number of battery cells are used for a small mobile device, large devices, such as electric motor vehicles, hybrid electric motor vehicles, and electric bicycles, require high power output and high capacity, and thus battery modules, in which a plurality of battery cells are electrically connected to each other, may be used for such large devices.

Secondary batteries may be categorized into can-type batteries, which are cylindrical or hexahedral, and pouch-type batteries, which are flexible, in accordance with shapes of cases in which battery units are housed.

A cylindrical secondary battery includes a can that houses a battery unit and a bare cell that includes a cap assembly for sealing an opening of the can. To electrically connect a plurality of bare cells to each others, a conductive plate is located on cap-ups, each of which is located in each of cap assemblies of the bare cells and functions as an electrode terminal, and the conductive plate is welded to the plurality of cap-ups.

In the related art, a plurality of protrusions are formed on a conductive plate and a welding operation is carried out while cap-ups are contacting the protrusions. However, since the surfaces area of a cap-up is relatively small, it is not easy to align the protrusions with respect to the cap-ups. Therefore, bad welding may frequently occur, and thus the overall welding strength may be disadvantageously decreased.

Figure 1:
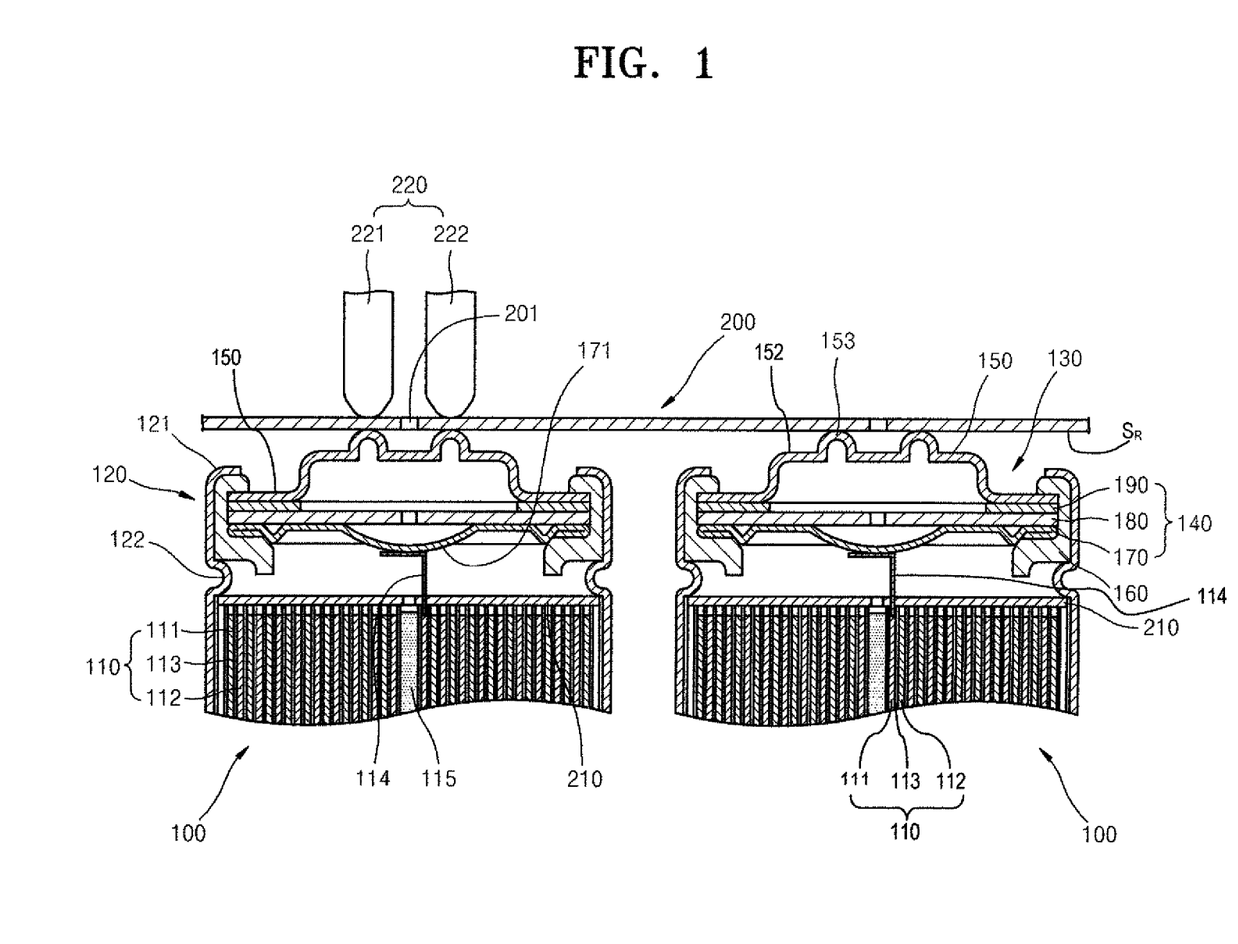
FIG. 1 is a diagram of a secondary battery constructed as an embodiment of the present invention in a cross sectional view of the secondary battery.

FIG. 1 is a diagram of a secondary battery constructed as an embodiment of the present invention.

Referring to FIG. 1, the secondary battery includes bare cells 100 and a conductive plate 200 that electrically connects adjacent bare cells 100.

With respect to one bare cell 100, a can 120 in which a battery unit 110 is housed is prepared in the bare cell 100. The battery unit 110 includes a positive electrode plate 111, a negative electrode plate 112, and a separator 113 interposed between the positive electrode plate 111 and the negative electrode plate 112.

A positive electrode lead 114 is electrically connected to the positive electrode plate 111. The positive electrode lead 114 extends to an upper portion of the can 120, and is partially bent. A negative electrode lead 116 (refer to FIG. 6) is electrically connected to the negative electrode plate 112. The negative electrode lead 116 extends to a lower portion of the can 120 and is welded to a bottom of the can 120.

The battery unit 110 is formed by winding the positive electrode plate 111, the separator 113, and the negative electrode plate 112 into a jelly-roll shape.

A center pin 115 is inserted into a center of the battery unit 110. The center pin 115 prevents the battery unit 110 from unwinding and helps movement of gas generated within the battery unit 110.

The battery unit 120 wound into a jelly-roll shape is inserted into the can 120. The can 120 may be a cylindrical container capable of housing the battery unit 110. Since the negative electrode plate 116 is welded to the can 120, the can 120 itself may function as a negative electrode terminal. The can 120 may be formed of a conductive metal, such as aluminium (Al), iron (Fe), an aluminum alloy, or an iron alloy, and is fabricated by using, for example, a deep drawing method.

A cap assembly 130 is installed on top of the can 120 to seal an opening of the can 120. The cap assembly 130 includes a plurality of safety elements 140 installed on top of the battery unit 110, a conductive cap-up 150 installed on top of the safety elements 140, and a gasket 160 installed around the safety elements 140 and the conductive cap-up 150.

The safety elements 140 include a safety vent 170, a current interrupt device (CID) element 180, and a positive thermal coefficient (PTC) element 190. However, the present invention is not limited thereto, and the components of the safety elements 140 may vary for securing safety of a battery having the bare cell 110 when the bare cell 100 malfunctions.

The safety vent 170 may be formed as a plate, and a deforming unit 171 convex downward may be formed at a center of the safety vent 170. The deforming unit 171 is connected to an end of the positive electrode lead 114. The deforming unit 171 may be reversed upward when the pressure within the bare cell 100 excessively rises. As a result, the positive electrode lead 114 is disconnected from the deforming unit 171, and thus a charging current may be stopped.

The CID element 180 is installed on top of the safety vent 170, and is electrically connected to the safety vent 170. The CID element 180 is broken when the deforming unit 171 is deformed convex upward, and thus an internal circuit of the bare cell is cut.

The PTC element 190 is installed on top of the CID element 180, and is electrically connected to the CID element 180. The PTC element 190 is an element, which becomes an open circuit when the temperature thereof exceeds a certain temperature. The PTC element 190 stops charging/discharging currents when the temperature of the bare cell 100 is abnormally high. Since the PTC element 190 operates reversibly, when the temperature of the bare cell 100 decreases after currents are stopped by the operation of the PTC element 190, the electrical resistance of the PTC element 190 is also reduced, and thus the PTC element 190 may function as it did before. The PTC element 190 becomes an open circuit when the temperature of the bare cell 100 increases to around 100° C.

The cap-up 150 is installed on top of the PTC element 190. The cap-up 150 is formed of a conductive material. The cap-up 150 functions as a positive electrode terminal by being electrically connected to the positive electrode plate 111 via the positive electrode lead 114, the safety vent 170, the CID element 180, and the PTC element 190, which are sequentially stacked.

The gasket 160 is installed around the cap-up 150, the safety vent 170, the CID element 180, and the PTC element 190 to surround the components and to insulate the cap assembly 130 from the can 120. The gasket 160 is formed of an electrical insulation material.

An upper end of the can 120 forms a crimping portion 121 by being bent inward and pressing an upper portion of the gasket 160. A portion of the can 120 extending from the upper end of the can 120 to a bottom end of the cap assembly 130 forms a beading portion 122 by being bent inward. Accordingly, the position of the cap assembly 130 is determined.

Meanwhile, a ring-type upper insulation plate 210 is installed between an upper portion of the battery unit 110 and the beading unit 122.

Here, the bare cells 100 are connected either in series or in parallel to be used in a device requiring high power output and high capacity. Therefore, the plurality of bare cells 100 are electrically connected to each others via the conductive plate 200.

Detailed descriptions of the elements mentioned above are given below.

Figure 2:
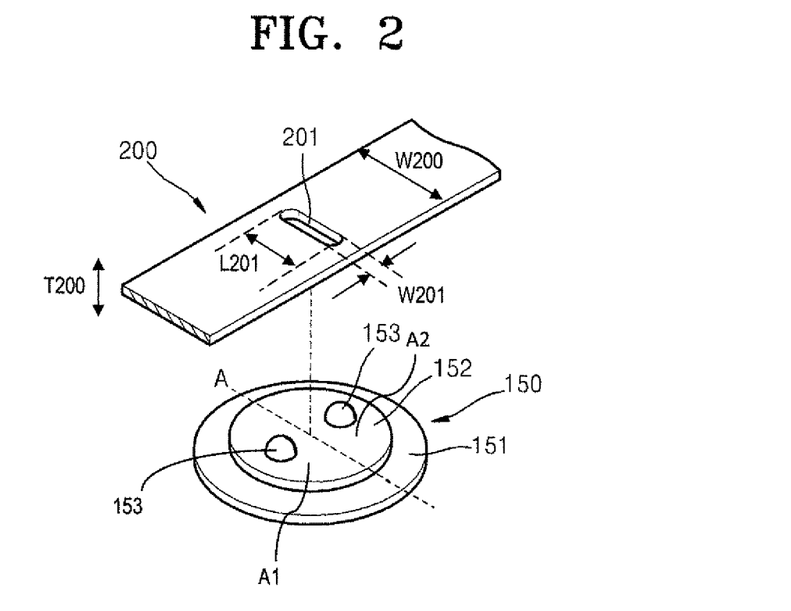
FIG. 2 is a diagram showing the cap-up and the conductive plate of FIG. 1 separately in an exploded perspective view.

FIG. 2 is a diagram showing the cap-up 150 and the conductive plate 200 of FIG. 1 separately in an exploded perspective view.

Hereinafter, like reference numerals refer to like elements with like functions.

Referring to FIG. 2, a disc-type base 151 is prepared. The periphery of the base 151 may be surrounded by a portion of the gasket 160 as shown in FIG. 1.

A terminal 152 is formed on a top surface of the base 151. The terminal 152 protrudes from the base 151 toward the conductive plate 200.

A plurality of embossments 153 are formed on the terminal 152. The embossments 153 protrude from the terminal 152 toward the conductive plate 200. The embossments 153 may have any structure as long as the embossments 153 protrude from the terminal 152, and may be formed by using any of various methods, such as punching, etching, or scratching.

The conductive plate 200 is a metal plate electrically connected to the embossments 153 in order to connect a plurality of bare cells in series or in parallel. The conductive plate 200 may be a nickel plate, a copper plate, or a copper plate on which a nickel layer is plated. However, the present invention is not limited thereto, and any conductive material may be used.

A slit 201 is formed in the conductive plate 200. Here, the embossments 153 formed on the cap-up 150 are arranged at predetermined positions with respect to the slit 201 when welded.

The slit 201 penetrates the conductive plate 200 in a thickness direction $T_{200}$ of the conductive plate 200. The slit 201 may extend straightly in a width direction $W_{200}$ of the conductive plate 200. The width $W_{201}$ of the slit 201 may be less than 3 mm and the length $L_{201}$ of the slit 201 may be less than 10 mm in the present embodiment, for example. The size of the slit 201 however may be freely changed in accordance with the size of the cap-up 150.

Figure 3:
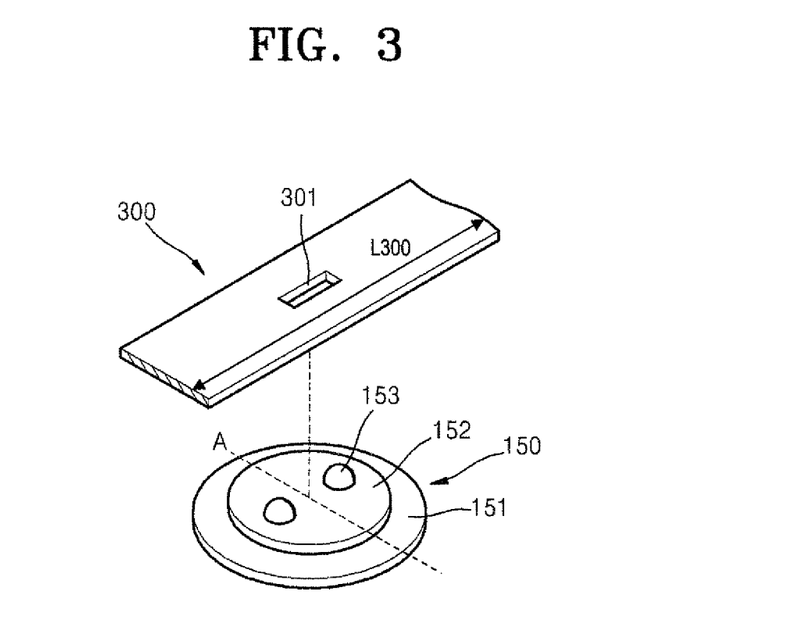
FIG. 3 is an exploded perspective view showing where a cap-up constructed as an embodiment of the present invention and a conductive plate are arranged.
Figure 4:
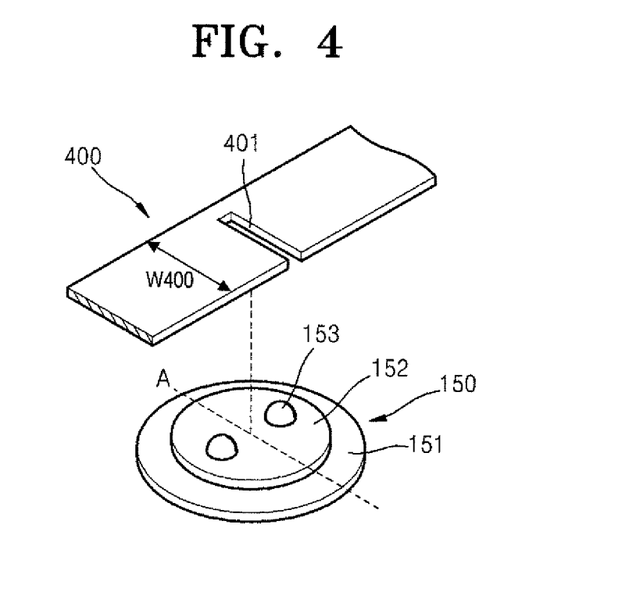
FIG. 4 is an exploded perspective view showing where a cap-up constructed as an embodiment of the present invention and a conductive plate are arranged.
Figure 5:
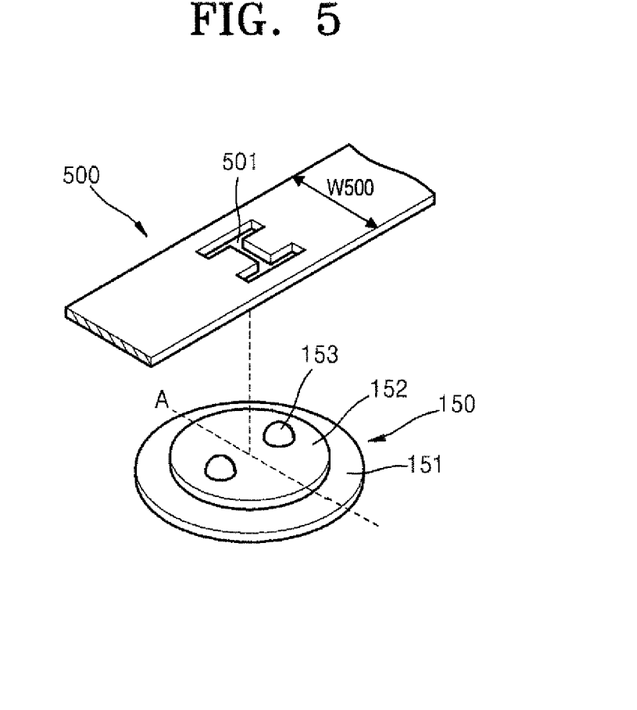
FIG. 5 is an exploded perspective view showing where a cap-up constructed as an embodiment of the present invention and a conductive plate are arranged.

The slit 201 may be formed in various shapes. For example, the slit may be a straight slit 301 extending in a length direction $L_{300}$ of a conductive plate 300 as shown in FIG. 3, a slit 401 formed by partially cutting the conductive plate 400 from an edge of the conductive plate 400 across a center of the conductive plate 400 as shown in FIG. 4, or an "I" shaped slit 501 formed at a center of a conductive plate 501 as shown in FIG. 5. More specifically, as shown in FIG. 4, the slit 401 may be formed by partially cutting the conductive plate 400 from an edge of the conductive plate 400 across a center of the conductive plate 400 along a width direction $W_{400}$ of the conductive plate 400; as shown in FIG. 5, the "I" shaped slit 501 may be formed at a center of a width $W_{500}$ of a conductive plate 501.

The present invention is however not limited thereto, and the slit formed in the conductive plate may have any shape as long as the slit is formed in a conductive plate, e.g., a circular slit, an elliptical slit, or a polygonal slit.

Referring back to FIG. 2, when the symmetrical center of the slit 201 is positioned on an imaginary symmetry axis A of the cap-up 150 facing the slit 201, the embossments 153 are arranged such that ratios of the area occupied by the embossments 153 in each of regions of the cap-up 150 separated by the imaginary symmetry axis A with respect to the area of each of the regions are the same.

More specifically, as shown in FIG. 2, when the cap-up 150 facing the slit 201 is divided by the imaginary symmetry axis A into two regions A1 and A2, the ratio between the area occupied by the embossments 153 in region A1 and the area of region A1 is equal to the ratio between the area occupied by the embossments 153 in the region A2 and the area of the region A2. When the two regions A1 and A2 have same areas, the area occupied by the embossments 153 in region A1 is equal to the area occupied by the embodiments 153 in region A2.

Furthermore, the number of embossments 153 in each of the divided regions of the cap-up 150 may be the same. In the present embodiment, one embossment 153 protrudes from the terminal 152 in each of the divided regions of the cap-up 150 around the imaginary symmetry axis A, and the embossments 153 have the same size and the same shape.

The entire area occupied by the embossments 153 is less than the area of the cap-up 150 minus the area of the portion having the same size as the slit 201. The areas of each of the embossments 153 with respect to the entire areas of each of the divided regions of the cap-up 150 are the same. However, the present invention is not limited thereto. The size of the slit 201 may be determined in consideration of voltage and current applied by a welding device when the conductive plate 200 is welded to the cap-up 150.

As described above, the secondary battery having a configuration as shown in FIGS. 1 and 2 includes the plurality of bare cells 100 connected in series or in parallel to obtain energy of high power and high capacity.

To connect the plurality of bare cells 100 in series or in parallel, the conductive plate 200 is placed on the plurality of cap-ups 150, and a rear surface $S_R$ of the conductive plate 200 contacts the plurality of embossments 153 of the plurality of cap-ups 153. Here, the plurality of embossments 153 contact the rear surface $S_R$ of the conductive plate 200 on two opposite sides of the slit 201. The plurality of embossments 153 may be disposed symmetrically with respect to the slit 201.

Next, a resistance projection welding operation is performed by placing welding rods 220 on top of the conductive plate 200 and generating high electrical resistance at a location where the embossments 153 and the conductive plate 200 contact each others by applying a predetermined voltage.

At this time, since the slit 201 is formed in and perforates the conductive plate 200, current flows applied from a first welding rod 221 to a second welding rod 222 via the conductive plate 200 and the plurality of embossments 153, and thus the path of applied currents may be sufficiently long, so that welding strength may be improved when the conductive plate 200 is electrically connected to the plurality of cap-ups 150. Furthermore, since the embossments 153 are formed on the cap-ups 150, the welding joint between the conductive plate 200 and the cap-ups 150 may be easily determined.

Figure 6:
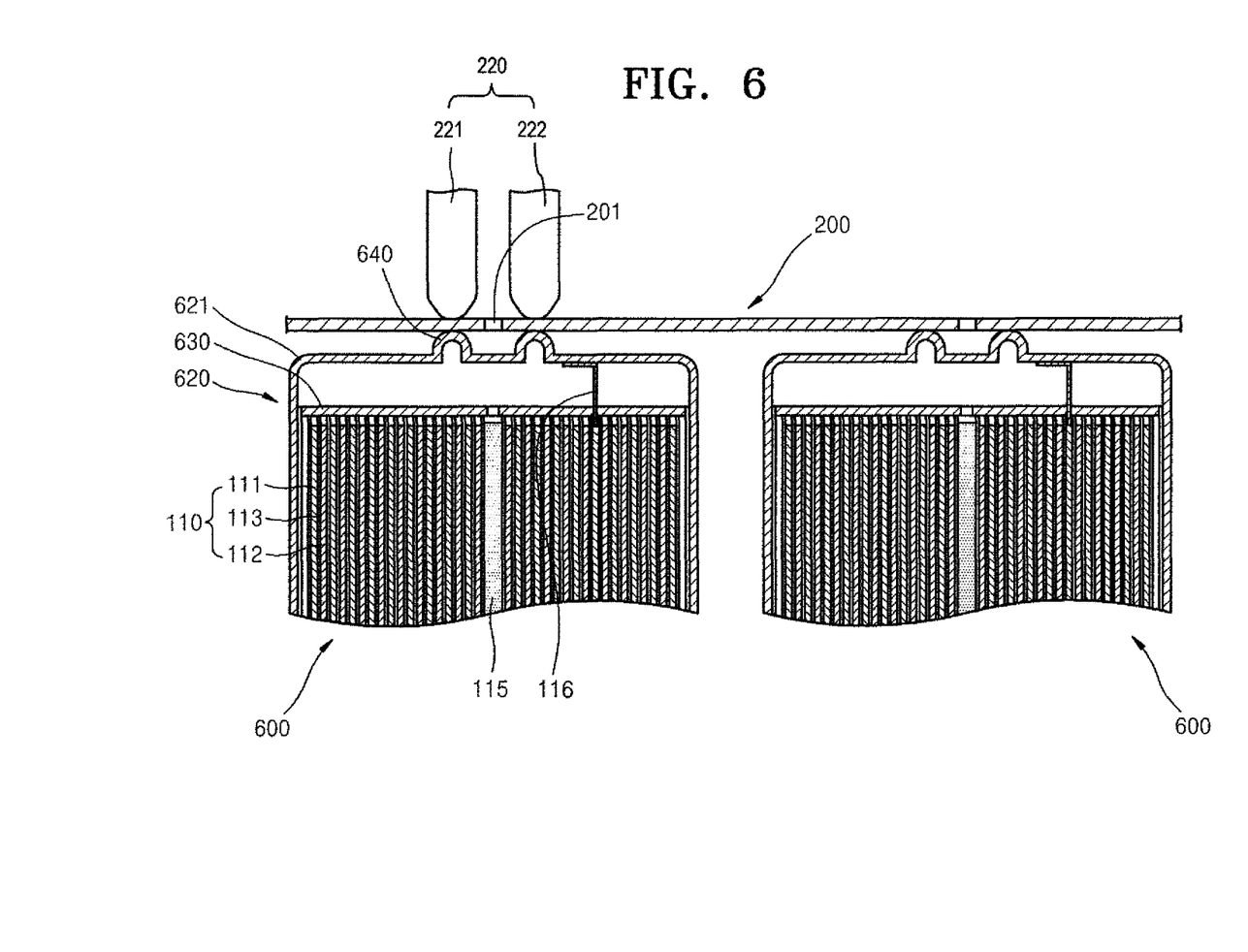
FIG. 6 is a diagram of a secondary battery constructed as another embodiment of the present invention in a cross sectional view of the secondary battery.

FIG. 6 is a diagram of a secondary battery according to another embodiment of the present invention.

In the present embodiment, a conductive plate is electrically connected to a bottom of a can. A cap assembly is form in a top end of the can.

Referring to FIG. 6, the secondary battery includes bare cells 600 and the conductive plate 200 electrically connecting adjacent bare cells 600.

With respect to one bare cell 600, a can 620 in which one battery unit 110 described above with respect to the previous embodiment is housed is prepared in the bare cell 600. A ring-type bottom insulation plate 630 is installed below the battery unit 110.

A negative electrode lead 116 is electrically connected to the negative electrode plate 112 of the battery unit 110. The negative electrode lead 116 is partially bent and extends to a bottom 621 of the can 620. Therefore, the can 620 itself may function as a negative electrode terminal.

At this point, a plurality of embossments 640 protrudes from the bottom 621 of the can 620 toward the conductive plate 200. The embossments 640 may have any shape as long as the embossments 640 protrude from the bottom 621 of the can 620.

The embossments 640 may be electrically connected to the conductive plate 200 in which the slit 201 is formed as described above. The slit 201 penetrates the conductive plate 200 in the thickness direction of the conductive plate 200.

When the symmetrical center of the slit 201 is positioned on an imaginary symmetry axis of the bottom 621 of the can 620 facing the slit 201, the embossments 640 are arranged such that the area occupied by the embossments 640 in each of regions of the bottom 621 of the can 620 around the imaginary symmetry axis A with respect to the area of each of the regions are the same. The plurality of embossments 640 may be disposed symmetrically with respect to the slit 201.

Furthermore, the number of embossments 640 in each of the divided regions of the bottom 621 of the can 620 may be the same. In the present embodiment, one embossment 640 protrudes from the bottom 621 of the can 620 in each of the regions around the imaginary symmetry axis of the bottom 621 of the can 620.

The entire area occupied by the embossments 640 is less than the remaining area of the bottom 621 of the can 620 other than the area of the portion of the bottom 621 of the can 620 corresponding to the size of the slit 201. The ratios between the area occupied by the embossments 640 in each of regions of the bottom 621 of the can 620 separated by the imaginary symmetry axis A and the area of each of the regions may be the same.

Figure 7:
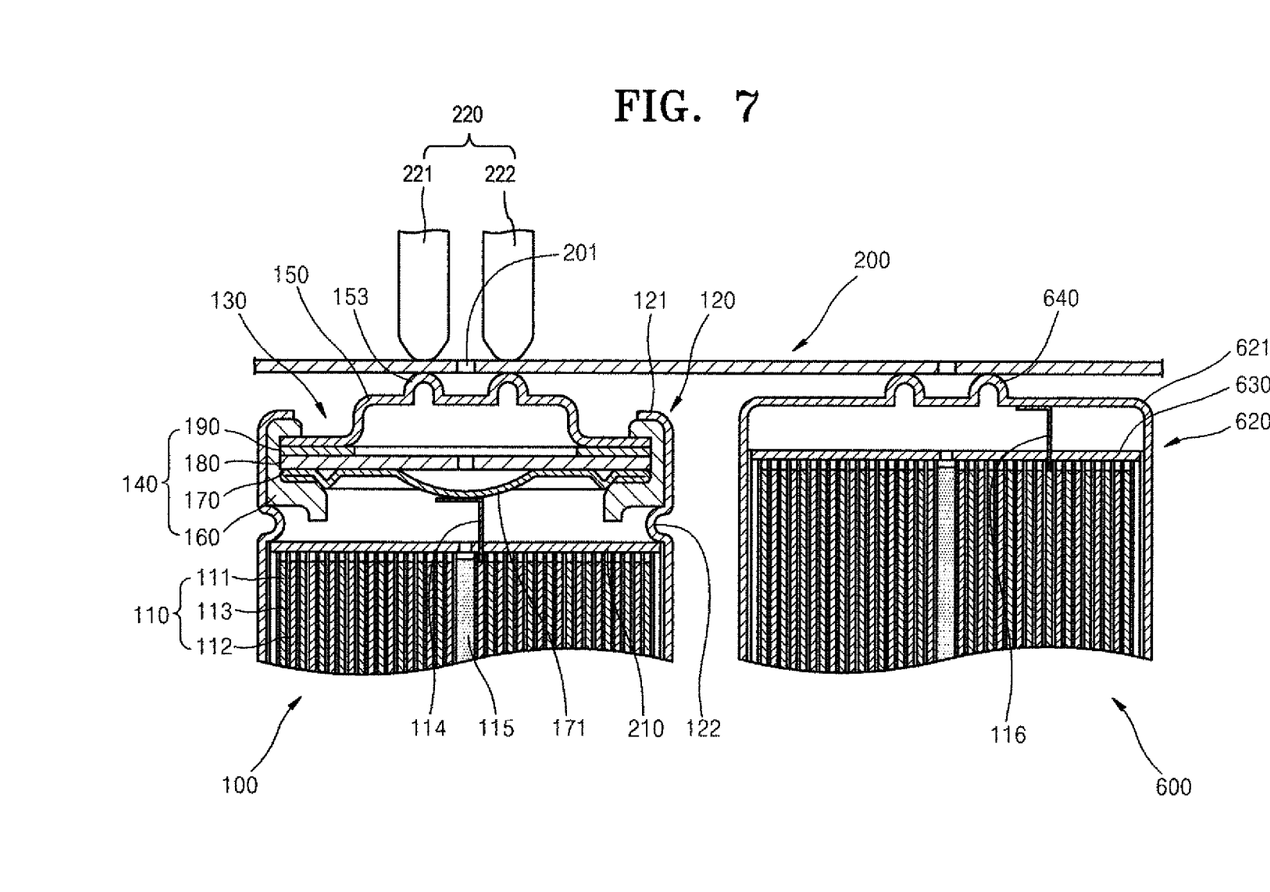
FIG. 7 is a diagram of a secondary battery constructed as another embodiment of the present invention in a cross sectional view of the secondary battery.

FIG. 7 is a diagram of a secondary battery according to another embodiment of the present invention.

In the present embodiment, a conductive plate is electrically connected to a plurality of bare cells in the secondary battery, which is a combination of the secondary battery shown in FIG. 1 and the secondary battery shown in FIG. 6.

Referring to FIG. 7, the secondary battery includes a plurality of the bare cells 100 and 600 and the conductive plate 200 electrically connected to the plurality of bare cells 100 and 600.

In case of a first bare cell 100, the cap-up 150 used as the positive electrode terminal is arranged in a direction, and, in case of a second bare cell 600, the bottom 621 of the can 620 used as the negative electrode terminal is arranged in the same direction as the cap-up 150 of the first bare cell 100.

The conductive plate 200 is installed on top of the cap-up 150 of the first bare cell and on the bottom 621 of the can 620 of the second bare cell 600, and thus the conductive plate 200 electrically connects the first bare cell 100 and the second bare cell 600.

Here, the embossments 153 are formed on the cap-up 150 of the first bare cell 100, and the embossments 640 are formed on the bottom 621 of the can 620 of the second bare cell 600. The rear surface of the conductive plate 200 in which the slit 201 is formed is connected to the embossments 153 and 640 via a resistance projection welding. Since connection relationships between the embossments 153 and 640 and the conductive plate 200 are described above, detailed descriptions thereof will be omitted.

As described above, according to the one or more of the above embodiments of the present invention, a cap assembly, a can, and a secondary battery employing the same may exhibit the following effects.

In the embodiments as shown in FIGS. 1 and 6, the bare cells are electrically connected in series; in the embodiment as shown in FIG. 7, the bare cells are electrically connected in parallel.

First, since a cap-up may be properly welded to a desired position on a conductive plate, bad welding may be reduced, and welding strength may be improved.

Second, since embossments may be integrally formed simultaneously and together with a cap-up or a can, quality management is easy.

Third, since no embossment is formed on a conductive plate, less number of operations are necessary for fabricating a conductive plate.

Fourth, since welding areas of a cap-up or a can may be reduced, it is not necessary to increase sizes of a cap-up or a can for easy welding.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A secondary battery, comprising:
    a plurality of bare cells, each of which includes a cap-up used as an electrode terminal; and
    a conductive plate installed on top of the cap-ups and connecting a plurality of adjacent bare cells in series or in parallel,
    wherein a plurality of embossments are formed on the cap-up and are formed integrally and simultaneously together with the cap-up as a single continuous and undifferentiated monolithic body, and each of the embossments comprises a curved portion of an inner surface of the top of the cap-up,
    a slit is formed in the conductive plate, and
    the conductive plate is welded to the embossments.

2. The secondary battery of claim 1, wherein the embossments protrudes from the cap-up toward the conductive plate.

3. The secondary battery of claim 1, wherein, when a symmetrical center of the slit is positioned on an imaginary symmetry axis of the cap-up facing the slit, the embossments are arranged such that ratios between an area occupied by the embossments in each of regions of the cap-up separated by the imaginary symmetry axis of the cap-up and an area of each of the regions are the same.

4. The secondary battery of claim 3, wherein a same number of embossments are formed on each of the regions separated by the imaginary symmetry axis of the cap-up.

5. The secondary battery of claim 3, wherein an entire area occupied by the embossments is less than the area of the cap-up minus an area of a portion having a same size as the slit.

6. The secondary battery of claim 1, wherein the conductive plate is a nickel plate, a copper plate, or a copper plate on which a nickel layer is plated.

7. The secondary battery of claim 1, wherein the slit is one of a straight slit formed in the conductive plate, a cross-shaped slit formed in the conductive plate, a slit formed by partially cutting the conductive plate from an edge of the conductive plate across a center of the conductive plate, a circular slit formed in the conductive plate, an elliptical slit formed in the conductive plate, and a polygonal slit formed in the conductive plate.

8. A cap assembly of a secondary battery for sealing an opening of a can of a bare cell for housing a battery unit, the cap assembly comprising:
 a cap-up installed on top of the can and functioning as an electrode terminal;
 a plurality of safety elements installed between the battery unit and the cap-up; and
 a gasket installed to surround the safety elements and the conductive cap-up,
 wherein a plurality of embossments are formed on the cap-up to be welded to a conductive plate having a slit to connect a plurality of neighbouring bare cells in series or in parallel and the plurality of embossments are formed integrally and simultaneously together with the cap-up as a single continuous and undifferentiated monolithic body, each of the embossments comprises a curved portion of an inner surface of the cap-up, and the inner surface is disposed opposite to and facing the safety elements, and
 the embossments are arranged such that ratios between an area occupied by the embossments in each of regions of the cap-up separated by an imaginary symmetry axis of the cap-up and an area of each of the regions are the same.

9. The cap assembly of claim 8, wherein the cap-up comprises a base and a terminal protruding from the base toward the conductive plate, and the embossments protrudes from the terminal toward the conductive plate.

10. The cap assembly of claim 8, wherein a same number of embossments are formed on each of the regions of the cap-up separated by the imaginary symmetry axis of the cap-up.

11. The cap assembly of claim 8, wherein an entire area occupied by the embossments is less than the area of the cap-up minus an area of a portion having a same size as the slit.

12. A can for a bare cell housing a battery unit, wherein
 an electrode lead electrically connected to the battery unit is electrically connected to the can,
 a plurality of embossments, to which a conductive plate having a slit is to be welded in order to connect a plurality of neighboring bare cells in series or in parallel, are formed on a bottom of the can and are formed integrally and simultaneously together with the bottom of the can as a single continuous and undifferentiated monolithic body, each of the embossments comprising a curved portion of an inner surface of the bottom of the can, and
 the embossments are arranged such that ratios between an area occupied by the embossments in each of regions of the bottom of the can separated by an imaginary symmetry axis of the bottom of the can and an area of each of the regions are the same.

13. The can 12, wherein a same number of embossments are formed on each of the regions separated by an imaginary symmetry axis of the bottom of the can.

14. The can 12, wherein an entire area occupied by the embossments is less than an area of the bottom of the can minus an area of a portion having a same size as the slit.

15. A secondary battery, comprising:
 a plurality of bare cells, each bare cell comprising:
  a can for housing a battery unit; and
  a cap assembly comprising:
   a conductive cap-up installed on a top of the can and functioning as an electrode terminal;
   a plurality of safety elements installed between the battery unit and the cap-up; and
   a gasket installed to surround the safety elements and the conductive cap-up; and
 a conductive plate installed on top of the cap-ups and connecting a plurality of neighboring bare cells in series or in parallel,
 wherein a plurality of first embossments are formed on the cap-up and are formed integrally and simultaneously together with the cap-up as a single continuous and undifferentiated monolithic body,
 a slit is formed in the conductive plate,
 the conductive plate is welded to the first embossments, and
 a bottom of the can has second embossments, and a material forming the second embossments is same as that of the can and different from that of the conductive plate.

16. The secondary battery of claim 15, wherein, when a center of the slit is positioned on an imaginary symmetry axis of the cap-up facing the slit, the first embossments are arranged such that ratios between an area occupied by the first embossments in each of regions of the cap-up separated by the imaginary symmetry axis of the cap-up and an area of each of the regions are the same.

17. The secondary battery of claim 15, wherein the cap-up comprises a base and a terminal protruding from the base toward the conductive plate, and
 the first embossments protrudes from the terminal toward the conductive plate.

18. The secondary battery of claim 15, wherein a same number of first embossments are formed on each of the regions of the cap-up separated by the imaginary symmetry axis of the cap-up.

19. The secondary battery of claim 15, wherein an entire area occupied by the first embossments is less than an area of the cap-up minus an area of a portion having a same size as the slit.

20. The secondary battery of claim 15, wherein the conductive plate is a nickel plate, a copper plate, or a copper plate on which a nickel layer is plated.

21. The secondary battery of claim 15, wherein the slit is one of a straight slit formed in the conductive plate, a cross-shaped slit formed in the conductive plate, a slit formed by partially cutting the conductive plate from an edge of the conductive plate across a center of the conductive plate, a circular slit formed in the conductive plate, an elliptical slit formed in the conductive plate, and a polygonal slit formed in the conductive plate.

22. The secondary battery of claim 15, wherein
 when a center of the slit is positioned on an imaginary symmetry axis of the bottom of the can, ratios between an area occupied by the second embossments in each of regions of the bottom separated by an imaginary symmetry axis of the bottom and an area of each of the regions of the bottom of the can are the same.

23. The secondary battery of claim 15, wherein the cap-up is a first electrode terminal electrically connected to a first electrode plate of the battery unit, and
 the can is a second electrode terminal electrically connected to a second electrode plate of the battery unit.

* * * * *